United States Patent [19]
Brennenstuhl et al.

[11] Patent Number: 5,998,548
[45] Date of Patent: Dec. 7, 1999

[54] COMPRESSIBLE, SULFUR-CONTAINING SILICONE RUBBER

[75] Inventors: Werner Brennenstuhl, Burgkirchen; Manfred Mittermeier, Mehring; Heinz-Max Rohrmüller, Burghausen; Erhard Bosch, Winhöring; Ingomar Kovar; Klaus-M. Matejcek, both of Burghausen, all of Germany

[73] Assignee: Wacker-Chemie GmbH, Munich, Germany

[21] Appl. No.: 09/135,365

[22] Filed: Aug. 17, 1998

[30] Foreign Application Priority Data

Aug. 18, 1997 [DE] Germany .............................. 197 35 813

[51] Int. Cl.$^6$ .................................................... C08F 36/00
[52] U.S. Cl. ......................................... 525/331.9; 532/218
[58] Field of Search .......................... 523/218; 525/331.9

[56] References Cited

U.S. PATENT DOCUMENTS

| | | |
|---|---|---|
| 3,615,972 | 10/1971 | Morehouse et al. . |
| 4,397,799 | 8/1983 | Edgren et al. . |
| 4,657,965 | 4/1987 | Watanabe ................ 524/506 |
| 4,670,496 | 6/1987 | Kaniecki ................ 524/364 |
| 4,722,379 | 2/1988 | Botzman ................ 152/525 |
| 5,246,973 | 9/1993 | Naqamura et al. . |
| 5,258,212 | 11/1993 | Tomaru et al. . |
| 5,362,493 | 11/1994 | Skotheim ................ 429/194 |
| 5,487,895 | 1/1996 | Dapper ................ 424/278.1 |
| 5,580,794 | 12/1996 | Allen . |

FOREIGN PATENT DOCUMENTS

| | | |
|---|---|---|
| 0112807 | 7/1984 | European Pat. Off. . |
| 0348372 | 2/1994 | European Pat. Off. . |

*Primary Examiner*—Paul R. Michl
*Attorney, Agent, or Firm*—Brooks & Kushman P.C.

[57] ABSTRACT

Compositions which crosslink to form elastomers and are based on (A) hollow polymer bodies,
(B) addition-crosslinkable organosilicon compounds, and
(C) organic sulfur compounds.

19 Claims, No Drawings

COMPRESSIBLE, SULFUR-CONTAINING SILICONE RUBBER

TECHNICAL FIELD

The invention relates to compositions which crosslink to form elastomers, a process for producing them, moldings and seals which are produced from these compositions and also a process for producing them.

Compressible silicone rubber is described in U.S. Pat. No. 5,258,212. The compressible silicone rubber described there comprises hollow spheres of plastic, glass or fused silica. This silicone rubber is used to seal a hard disc housing by means of a bead-like seal which is applied by means of a special apparatus.

U.S. Pat. No. 5,580,794 describes silicone elastomers which comprise hollow spheres of epoxy material, glass, metal, ceramic and similar materials. When used as sealing materials, these elastomers are said to display improved oil and pressure resistance.

U.S. Pat. No. 5,246,973 provides foamed silicone elastomers. These elastomers are produced using a mixture of silicone elastomer with thermally expandable hollow spheres which have a volatile substance such as butane or isobutane, etc., in their interior. This mixture is heated to liberate the volatile substances from the expandable hollow spheres and to foam the silicone elastomer.

SUMMARY OF THE INVENTION

It is an object of the invention to overcome the disadvantages of the prior art and, in particular, to provide compressible silicone elastomers which can be quickly produced and processed in a simple, economical process.

The invention provides organosilicon compositions which can be crosslinked to form compressible elastomers and are based on (A) hollow polymer bodies, (B) addition-crosslinkable organosilicon compounds, and (C) organic sulfur compounds.

The compositions of the invention preferably have a viscosity of from 1000 to 2,000,000 mPa·s, preferably 100,000 to 1,500,000 mPa·s and particularly preferably from 500,000 to 1,000,000 mPa·s.

DETAILED DESCRIPTION OF THE INVENTION

The hollow polymer bodies (A) used as constituent I are preferably hollow bodies based on an organic polymer material such as, preferably, polyacrylonitrile, polyvinyl chlorides, polyvinyl acetates, polyesters, polycarbonates, polyethylenes, polystyrenes, polymethyl methacrylates, polyvinyl alcohols, ethylcellulose, nitrocellulose, benzylcellulose, epoxy resins, hydroxypropylmethylcellulose phthalate, copolymers of vinyl chloride and vinyl acetate, copolymers of vinyl acetate and cellulose acetate butyrate, copolymers of styrene and maleic acid, copolymers of acrylonitrile and styrene, copolymers of vinylidene chloride and acrylonitrile and the like. Processes for producing such hollow polymer bodies are known; in particular, such processes are described in EP-B 348 372 (HCASCO NOBEL AG) and the patent references cited therein, notably U.S. Pat. No. 3,615,972, U.S. Pat. No. 4,397,799 and EP-A-112807.

The hollow polymer bodies are preferably expanded hollow polymer bodies having a diameter of from 1 to 800 μm, preferably 5–100 μm and particularly preferably from 10 to 80 μm. The density in air is preferably from 10 to 100 kg/m³, preferably from 20 to 80 kg/m³ and particularly preferably from 20 to 60 kg/m³. Very particular preference is given to the hollow polymer bodies with the tradename Expancel™091 DE, a product of Expancel Nobel Industries. These hollow polymer bodies are preferably used in amounts of from 0.1 to 30% by weight, more preferably from 0.2 to 10% by weight and particularly preferably from 0.5 to 3% by weight.

The compositions of the invention are addition-crosslinking silicone rubber compositions known per se.

The addition-crosslinking silicone rubber compositions of the invention comprise the constituents:

as (A) constituent I, hollow polymer bodies as defined above, as (B) addition-crosslinkable organosilicon compounds, preferably a polyorganosiloxane (II) or more preferably a mixture of (IIa), a polyorganosiloxane having at least two alkenyl groups per molecule, (IIb), a polyorganosiloxane having two terminal Si—H groups, and (III), a polyorganosiloxane having at least two Si—H groups per molecule as crosslinker, and as catalyst, (IV), a hydrosilylation catalyst.

As polyorganosiloxanes (II), preference is given to using a mixture of a polydimethylsiloxane having at least two terminal alkenyl groups (IIa) and a polydimethylsiloxane having at least two terminal Si—H groups (IIb).

Constituent (IIa) of the silicone rubber compositions of the invention is a polyorganosiloxane which has at least two alkenyl groups per molecule and preferably has a viscosity at 25° C. in the range from 500 to 50,000 mPa·s, preferably from 500 to 5,000 mPa·s for flowable compositions and preferably from 15,000 to 25,000 mPa·s for solid compositions. Constituent (IIa) is preferably used in amounts of 10–98% by weight, more preferably 20–80% by weight, and particularly preferably 50–70% by weight.

Constituent (IIb) of the silicone rubber compositions of the invention is a polyorganosiloxane which has at least two terminal Si—H groups per molecule and preferably has a viscosity at 25° C. in the range from 100 to 100,000 mPa·s, more preferably from 200 to 20,000 mPa·s and particularly preferably from 500 to 5000 mPa·s. Constituent (IIb) is preferably used in amounts of 0–98% by weight, more preferably 5–70% by weight, and particularly preferably 20–40% by weight.

The polyorganosiloxane (II) is built up of units of the formula

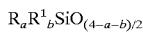
$$R_a R^1_b SiO_{(4-a-b)/2}$$

where a is 0, 1 or 2, b is 0, 1, 2 or 3, with the proviso that at least two radicals R are present in each molecule and the sum (a+b) is <4.

R is an alkenyl group or a hydrogen atom. As alkenyl groups, it is possible to select all alkenyl groups which can undergo a hydrosilylation reaction with an SiH-functional crosslinker. Preference is given to using alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, and cyclohexenyl, preferably vinyl and allyl.

$R^1$ is a substituted or unsubstituted, aliphatically saturated, monovalent hydrocarbon radical having from 1 to 10 carbon atoms, preferably from 1 to 6 carbon atoms. Examples of these are alkyl groups such as methyl, ethyl, propyl, butyl and hexyl; cycloalkyl groups such as cyclopentyl, cyclohexyl, and cycloheptyl; aryl and alkaryl groups such as phenyl, tolyl, xylyl, mesityl, benzyl, beta-phenylethyl, and naphthyl, or halogen-substituted groups such as 3,3,3-trifluoropropyl, o-, p- and m-chlorophenyl, bromotolyl and beta-cyanoethyl.

The alkenyl groups can be bound in any position of the polymer chain, in particular to the terminal silicon atoms.

Constituent (IIa) can also be a mixture of various alkenyl-containing polyorganosiloxanes which differ, for example, in their alkenyl group content, the type of alkenyl group, or structurally.

The structure of the alkenyl-containing polyorganosiloxanes can be linear, cyclic or branched. Branched polyorganosiloxanes comprise not only monofunctional units such as $RR^1_2SiO_{1/2}$ and $R^1_3SiO_{1/2}$, and difunctional units such as $R^1_2SiO_{2/2}$ and $RR^1SiO_{2/2}$, but also trifunctional units such as $R^1SiO_{3/2}$ and $RSiO_{3/2}$, and/or tetrafunctional units of the formula $SiO_{4/2}$, where R and $R^1$ are as defined above. The content of these trifunctional and/or tetrafunctional units leading to branched polyorganosiloxanes, which is typically very low, i.e. less than 0.1 mol %, should not significantly exceed 20 mol %. The alkenyl-containing polyorganosiloxane can also comprise units of the formula $-OSi(R^2R^3)R^4Si(R^2R^3)O-$, where both $R^2$ and $R^3$ are as defined above for R and $R^1$ respectively, and $R^4$ is a divalent organic radical such as ethylene, propylene, phenylene, biphenylene or polyoxymethylene. Such units can be present in the constituent (II) in a proportion of up to 50 mol %.

Particular preference is given to using vinyl-containing polydimethylsiloxanes whose molecules correspond to the formula

$(ViMe_2SiO_{1/2})_2(ViMeSiO)_a(Me_2SiO)_b$, where a and b are non-negative numbers and conform to the following relationships: a+1>0, 50<(a+b)<2200, preferably 200<(a+b)<1000, and 0<(a+1)/(a+b)<0.2.

The sulfur compound (C) according to the invention is preferably an organic sulfur compound, e.g. one or more selected from the group consisting of thiols (mercaptans such as alkylthiols, and arylthiols), mercaptoheterocycles such as mercaptoimidazols, mercaptobenzimidazols, ketene-S,X-acetals, where X is preferably N or S, thioacetals, sulfanes (thioethers), disulfanes (dithioethers), polysulfanes, thioamides, thioureas, thiurams (thiuram monosulfides, disulfides or polysulfides, bisthiocarbamoylmono-, di- or polysulfanes), thiuronium salts, thiocarbamates, dithiocarbamates and their Zn, Fe, Ni, Co or Cu salts, thiocyanates, isothiocyanates, thiocarbonyl compounds (such as thioaldehydes, thioketones, thiolactones, thiocarboxylic acids), thia-heterocycles (such as thiophene, 1,2- or 1,3-dithiols and 1,2- or 1,3-dithiolthiones, thiazols, mercaptothiazols, mercaptothiadiazols, benzodithiols or benzodithiolthiones, benzothiazols, mercaptobenzothiazols, phenothiazines, thianthrenes), a silane having sulfur-containing functional groups, e.g. a mercaptoalkyl-alkyl-alkoxysilane of the formula (1),

$(R^5O)_{3-n}R^6_nSi-R^7-SH$ (1)

a bis(trialkoxysilyl-alkyl)mono-, di- or polysulfane of the formula (2), a thiocyanatoalkyltrialkoxysilane of the formula (3),

$[(R^8O)_3Si-R^9-]_2-S_n$ (2)

$(R^{10}O)_3Si-R^{11}-SCN$ (3)

a filler, preferably silica, which has had applied to it or has been reacted or mixed with these silanes having sulfur-containing functional groups, e.g. finely divided silicon dioxide, and/or the presence of a thiofunctional siloxane, e.g. a polydimethylsiloxane-co-mercaptoalkyl-, preferably -ethyl- or -propyl-siloxane in at least one part of the multi-part composition, preferably the H-siloxane-containing part.

$R^5$ is a substituted or unsubstituted, aliphatically saturated monovalent hydrocarbon radical having from 1 to 10 carbon atoms, preferably from 1 to 6 carbon atoms. Examples of such hydrocarbon radicals are alkyl groups such as preferably methyl, ethyl, propyl, butyl and hexyl; and cycloalkyl groups such as cyclopentyl, cyclohexyl and cycloheptyl.

$R^6$ is a substituted or unsubstituted, aliphatically saturated monovalent hydrocarbon radical having from 1 to 10 carbon atoms, preferably from 1 to 6 carbon atoms. Examples of such hydrocarbon radicals are alkyl groups such as preferably methyl, ethyl, propyl, butyl and hexyl; cycloalkyl groups such as cyclopentyl, cyclohexyl and cycloheptyl; and aryl and alkaryl groups such as phenyl, tolyl, xylyl, mesityl and benzyl.

$R^7$ is a substituted or unsubstituted, aliphatically saturated, divalent hydrocarbon radical having from 1 to 10 carbon atoms, preferably from 1 to 6 carbon atoms. Examples of such hydrocarbon radicals are alkylene groups such as preferably methylene, ethylene, propylene, butylene, hexylene and phenylene, particularly preferably propylene.

$R^8$ and $R^{10}$ are as defined for $R^5$.

$R^9$ and $R^{11}$ are as defined for $R^7$.

n=1–10, preferably n=2 or 4.

It is also possible to use mixtures of these organic sulfur compounds.

The organic sulfur compound or mixture of such compounds is used in amounts of 0.0001% by weight to 2% by weight, preferably 0.001% by weight to 0.2% by weight, particularly preferably 0.005 to 0.15% by weight, based on the total weight of the composition.

As crosslinker (D), constituent (III) is used in the addition crosslinking of the silicone rubber composition of the invention; constituent (III) is preferably an SiH-functional polyorganosiloxane which is built up of units having the following formula

$H_cR^1_dSiO_{(4-c-d)/2}$ where c is 0, 1 or 2, d is 0, 1, 2 or 3, with the proviso that the sum (c+d) is <4 and that at least two silicon-bonded hydrogen atoms are present per molecule and $R^1$ is as defined above.

Preference is given to using a polyorganosiloxane containing three or more SiH bonds per molecule. When using a constituent (III) which has only two SiH bonds per molecule, the alkenyl-containing polyorganosiloxane (II) preferably has at least three alkenyl groups per molecule.

The polyorganosiloxane (III) is used as crosslinker. The hydrogen content of the crosslinker, based exclusively on the hydrogen atoms bound directly to silicon atoms, is in the range from 0.002 to 1.7% by weight of hydrogen, preferably from 0.1 to 1.7% by weight of hydrogen.

The polyorganosiloxane (III) preferably contains at least three and preferably at most 600 silicon atoms per molecule. Particular preference is given to using SiH crosslinkers which contain from 4 to 200 silicon atoms per molecule.

The structure of the polyorganosiloxane (III) can be linear, branched, cyclic or network-like. Linear and cyclic polyorganosiloxanes (III) are composed of units of the formulae $HR^1_2SiO_{1/2}$, $R^1_3SiO_{1/2}$, $HR^1SiO_{2/2}$ and $R^1_2SiO_{2/2}$, where $R^1$ is as defined above. Branched and network-like polyorganosiloxanes (III) further comprise trifunctional units such as $HSiO_{3/2}$ and $R^1SiO_{3/2}$, and/or tetrafunctional units of the formula $SiO_{4/2}$. With increasing content of trifunctional and/or tetrafunctional units, these crosslinkers have a network-like, resin-like structure. The organic radicals $R^1$ present in the polyorganosiloxane (III) are usually selected so as to be compatible with the organic radicals present in the constituent (II) so that the constituents (II) and (III) are miscible.

As crosslinker, it is also possible to use combinations and mixtures of the polyorganosiloxanes (III) described here.

Particularly preferred polyorganosiloxanes (III) have the formula

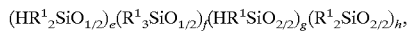

where the non-negative integers e, f, g and h conform to the following relationships: (e+f)=2, (e+g)>2, 5<(g+h)<200 and $0.1<g/(g+h)\leq 1$ and $R^1$ is as defined above.

The polyorganosiloxane (III) is preferably present in the curable silicone rubber composition in such an amount that the molar ratio of SiH groups to alkenyl groups is preferably from 0.5 to 5, more preferably from 1.0 to 3.0.

Constituent III is used in amounts of from 0.1 to 15% by weight, preferably in amounts of from 2 to 8% by weight and particularly preferably from 3 to 6% by weight.

Constituent (IV) serves as catalyst for the addition reaction (hydrosilylation) between the alkenyl groups of the constituent (II) and the silicon-bonded hydrogen atoms of the constituent (III). The literature describes numerous suitable hydrosilylation catalysts. In principle, it is possible to use all hydrosilylation catalysts customarily used in addition-crosslinking silicone rubber compositions.

Non-limiting examples of hydrosilylation catalysts which can be used are metals such as platinum, rhodium, palladium, ruthenium and iridium, preferably platinum, which may be fixed to finely divided support materials such as activated carbon, aluminum oxide or silicon dioxide.

Preference is given to using platinum and platinum compounds. Particular preference is given to those platinum compounds which are soluble in polyorganosiloxanes. Examples of soluble platinum compounds which can be used are the platinum-olefin complexes of the formulae $(PtCl_2\cdot olefin)_2$ and $H(PtCl_3\cdot olefin)$, with preference being given to using alkenes having from 2 to 8 carbon atoms, e.g. ethylene, propylene, isomers of butene and octene, or cycloalkenes having from 5 to 7 carbon atoms, e.g. cyclopentene, cyclohexene and cycloheptene. Further soluble platinum catalysts are the platinum-cyclopropane complex of the formula $(PtCl_2\cdot C_3H_6)_2$, the reaction products of hexachloroplatinic acid with alcohols, ethers and aldehydes or mixtures thereof or the reaction product of hexachloroplatinic acid with methylvinylcyclotetrasiloxane in the presence of sodium bicarbonate in ethanolic solution. Particular preference is given to complexes of platinum with vinylsiloxanes such as sym-divinyltetramethyl-disiloxane.

The hydrosilylation catalyst can also be used in microencapsulated form, with the finely divided solid which contains the catalyst and is insoluble in the polyorganosiloxane being, for example, a thermoplastic (polyester resins, silicone resins). The hydrosilylation catalyst can also be used in the form of an inclusion compound, for example in a cyclodextrin.

The amount of hydrosilylation catalyst used is determined by the desired crosslinking rate and also by economic considerations. When using customary platinum catalysts, the platinum content, based on platinum metal, of the curable silicone rubber composition is preferably in the range from 0.1 to 500 ppm by weight, preferably from 10 to 100 ppm by weight, of platinum metal. Otherwise, the catalyst may, if desired, be used together with an inhibitor, preferably in amounts of from 0.01 to 5% by weight.

Further additives can also be present in the compositions of the invention; thus, if desired, further additives may be present in the silicone rubber composition in a proportion of up to 85% by weight, preferably from 0.5 to 20% by weight. These additives can be, for example, fillers, dispersants, coupling agents, inhibitors, pigments, dyes, additives for increasing the flame resistance, plasticizers, etc. These include additives such as quartz flour, diatomaceous earth, clays, chalk, lithopones, carbon blacks, graphite, metal oxides, metal carbonates, metal sulfates, metal dusts, fibers, dyes, pigments, etc.

Examples of fillers are reinforcing fillers, i.e. fillers having a specific surface area measured by the BET method of at least 50 $m^2/g$, preferably 50–500 $m^2/g$, for example pyrogenic silica, silica hydrogels dehydrated with retention of the structure, i.e. "aerogels", and other types of precipitated silicon dioxide; and non-reinforcing fillers, i.e. fillers having a specific surface area measured by the BET method of less than 50 $m^2/g$, for example quartz flour, diatomaceous earth, calcium silicate, zirconium silicate, zeolites, iron oxide, zinc oxide, titanium dioxide, aluminum oxide, calcium carbonate, magnesium carbonate, zinc carbonate, carbon black, mica, and chalk. The fillers mentioned can be hydrophobicized by treatment with the abovementioned hydrophobicizing agents.

Examples of plasticizers are diorganopolysiloxanes which are liquid at room temperature and are terminated by triorganosiloxy groups, for example dimethylpolysiloxanes which are terminated by trimethylsiloxy groups and have a viscosity of from 10 to 10,000 mPa·s at 25° C.

In particular, resin-like polyorganosiloxanes which consist essentially of units of the formulae $R^1_3SiO_{1/2}$, $R^1SiO_{3/2}$ and/or $SiO_{4/2}$, if desired also $R^1_2SiO_{2/2}$, can be present in an amount of up to 50% by weight, preferably up to 20% by weight, based on the total weight of the silicone rubber. The molar ratio of monofunctional to trifunctional and/or tetrafunctional units in these resin-like polyorganosiloxanes is preferably in the range from 0.5:1 to 1.5:1. It is also possible for functional groups, in particular alkenyl groups, in the form of $RR^1_2SiO_{1/2}$—and/or $RR^1SiO_{2/2}$—units to be present.

The curable silicone rubber composition may comprise, in particular, additives which enable the processing time and the crosslinking rate of the composition to be set in a targeted manner. These inhibitors and stabilizers which are known per se are, for example: acetylenic alcohols such as ethynylcyclohexanol and 2-methyl-3-butyn-2-ol; polymethylvinylcyclosiloxanes such as methylvinylcyclotetrasiloxane; low molecular weight siloxane oils having vinyldimethylsiloxy end groups; trialkyl cyanurates; alkyl maleates such as diallyl maleate and dimethyl maleate; alkyl fumarates such as diethyl fumarate and diallyl fumarate; organic hydroperoxides such as cumene hydroperoxide, tert-butyl hydroperoxide and pinane hydroperoxide; organic peroxides; benzotriazole; organic sulfoxides; organic amines and amides; phosphines, phosphites, nitriles, diaziridines, and oximes.

The invention further provides a process for producing the compositions of the invention.

The compositions of the invention are produced as one or two component compositions by mixing the constituents using methods customary for the preparation of silicone rubber compositions.

The compositions of the invention are processed using customary 1-component or 2-component mixing and dosing units.

The addition-crosslinking compositions are preferably crosslinked for from 5 minutes to 24 hours at a temperature of preferably from 25 to 200° C., more preferably for from 5 minutes to 1 hour at a temperature of from 100 to 150° C.

The invention further provides compressible moldings, seals or sealing compositions which are produced from the compositions of the invention or the compositions produced by the process of the invention, and also processes for producing them.

The compositions of the invention can be used to produce sealing compositions, jointing compositions and moldings such as seals, e.g. O rings, round cords or plates, which are particularly suitable for a field of application in which high temperature fluctuations in a range from −65 to 250° C. occur. Such temperature fluctuations occur, in particular, in the operation of machines or vehicles which, owing to their operation, heat up and/or are used at fluctuating external temperatures. This applies, for example, to all machines and vehicles which are driven by internal combustion engines, e.g. motor vehicles, building machinery, stationary machines such as generators, etc.

The advantage of the compositions of the invention is that, in contrast to silicone rubber compositions which do not contain any hollow polymer bodies, they are highly compressible. The compressibility is improved by a factor of 20–40 compared to silicone rubber compositions without hollow polymer bodies.

As a result, very much lower pressures are necessary to effectively seal the housings.

A further advantage of the high compressibility is the reduction in the thermomechanical stresses on changes in temperature since although the material expands exactly the same as conventional compositions on heating, it compresses when it meets a resistance without further increasing the spacing between the surfaces to be sealed, so that when the temperature drops it still occupies the same volume as during expansion. This means that a seal cannot leak when it is exposed to temperature changes. Furthermore, such a seal cannot damage the housing to be sealed as a result of heating by, for example, splitting open the housing. Instead, the composition of the invention is compressed.

A further advantage of the compositions of the invention is that they can be easily cast without complicated, expensive machines, for example a 2-component foaming unit, but instead by using simpler 1- and 2-component dosing units, so that seals such as O rings can be produced at the point of use by introducing them into a mold, e.g. a groove, so that they remain at the point of use even if the article is later disassembled. This measure prevents the O ring from falling out without being noticed and the article from being reassembled later without the O ring and subsequent damage then occurring because of the missing O ring. This can, particularly in the case of articles which are used in motor vehicle electrics, lead to undesirable downtimes if, for example, an O ring which provides a seal against moisture in an article in the motor vehicle electrics is missing. If this O ring is missing, moisture frequently enters this article, e.g. because of the missing O ring, and the electrics thus no longer function and the vehicle is finally no longer operable.

Furthermore, sealing compositions can be produced from the compositions of the invention. These can, for example, be used for sealing electronic components. An advantage of these sealing compositions of the invention is that, owing to their compressibility, they do not destroy the electronic components despite the high coefficient of thermal expansion of the silicones even in the case of a temperature change, as is the case for conventional silicone compositions.

A further advantage of the compositions of the invention is the significantly lower density compared to conventional silicone compositions, which leads to a weight reduction in the components which is desirable, inter alia, in the case of motor vehicle applications since it contributes to a fuel saving.

A decisive advantage of the addition-crosslinking compositions of the invention is that the Shore hardness can be set to virtually any desired value by the use of the Si—H-terminated dimethylpolysiloxane (IIb). Depending on the ratio of the dimethylpolysiloxanes (IIa:IIb), Shore hardnesses from 0 to 70 can be achieved. Different sealing forces can be set with a corresponding degree of variability.

Furthermore, the moldings of the invention are rubbery-elastic moldings which have good to very good mechanical properties and can be produced economically by the process of the invention. Such moldings are preferably produced by casting, injection molding and transfer molding. This can, in principle, be carried out by means of automatic machines. It can also be carried out directly on a surface, e.g. a housing, without provision of a mold. This is preferably carried out automatically. On deformation, such moldings typically have a permanent deformation, termed "compressive set." This deformation is particularly high in the freshly produced state, i.e. when no further heat is applied. For certain applications, e.g. seals in the automobile and mechanical engineering sector where, for technical or cost reasons, further heating of the parts, i.e. heat treatment, is frequently not carried out, it is essential to achieve as low as possible a compressive set, particularly in the case of parts which have not been heat-treated. This object is achieved by the invention. However, heat treatment is also possible according to the invention.

The good reproducibility of the compressive set after storage when the organic sulfur compound is present in a small amount in the component (B) is particularly surprising. Thus, the crosslinking rate in the moldings of the invention even after a prolonged storage time is surprisingly lower than if the organic sulfur compound were present in the component (A). This makes it possible to guarantee a shelf life of up to six months for the manufactured product. The good storage stability therefore gives short, constant crosslinking times which ensure fast and continuous production. This means that the processing machines do not have to be readjusted every now and again to longer crosslinking times otherwise caused by storage, which leads to considerable cost savings and more moldings can be produced as a result of the short crosslinking time.

The vulcanized and un-heat-treated compositions which crosslink to form elastomers have a compressive set of preferably less than 50, more preferably less than 30 and particularly preferably less than 20, where a value of 0 means absolutely no compressive set. The compressive set is measured in accordance with DIN 53517.

EXAMPLES

Example 1

Production of a solid compressible 1-component sealant composition.

60 parts of a base mixture (consisting of 67 parts by weight of a vinyl-terminated polydimethylsiloxane having a viscosity of 20 Pa·s, 32 parts by weight of a pyrogenic silicon dioxide which has been surface-modified with hexamethyldisilazane and has a BET surface area of 300 m$^2$, and 1 part by weight of a mercapto-modified pyrogenic silicon dioxide as described in Example 5 are homogeneously mixed in a planetary mixer with 33 parts by weight of a vinyl-terminated polydimethylsiloxane having a viscosity of 20 Pa·s, 0.25 part by weight of a platinum catalyst, 0.5 part by weight of ethynylcyclohexanol, 2 parts by weight of trimethoxy(3-(oxiranylmethoxy)propyl)silane, 2.5 parts of a polydimethylsiloxane-co-hydrogenmethylpolysiloxane and 1 part by weight of Expancel™ DE 80.

The resulting pasty, curable silicone composition is pressed to form sheets and vulcanized for 15 minutes at 150° C.

Example 2

The procedure of Example 1 is followed, but without sulfur-treated silica.

Example 3
Production of a flowable, compressible 2component sealant composition.
Component A:
98.6 parts by weight of a vinyl-terminated dimethylpolysiloxane having a viscosity of 1000 mPa·s, 1 part by weight of Expancel DE 80 and 0.4 part by weight of a platinum catalyst are homogeneously mixed.
Component B:
20 parts by weight of a vinyl-terminated dimethylpolysiloxane having a viscosity of 1000 mPa·s, 75 parts by weight of an Si—H-terminated dimethylpolysiloxane having a viscosity of 1000 mPa·s, 0.5 part by weight of ethynylcyclohexanol, 1 part by weight of Expancel™ DE 80, 1.5 parts by weight of a mercapto-modified pyrogenic silicon dioxide as described in Example 5, and 2 parts by weight of a polydimethylsiloxane-co-hydrogenmethylpolysiloxane are homogeneously mixed.

The resulting flowable components A and B are mixed in a ratio of 1:1, pressed to form sheets and vulcanized for 15 minutes at 150° C.

| Example | Compressive set 22 h, 120° C. | Compressive set 22 h, 175° C. |
| --- | --- | --- |
| 1 | 15.00 | 36.00 |
| 2 | 34.00 | 55.00 |
| 3 | 35.00 | 54.00 |
| 4 | 55.00 | 78.00 |

Example 5
Production of a filler modified with organosulfur compounds.

10 g of water and subsequently 12.24 g of 3-mercaptopropyl-trimethoxysilane, obtainable from Wacker-Chemie under the name "Wacker Silan GF 70" are very finely dispersed by stirring in 100 g of pyrogenic silicon dioxide having a specific surface area measured by the BET method of 300 m$^2$/g, obtainable from Wacker-Chemie under the name "Wacker HDK T30" at room temperature and atmospheric pressure. The mixture is subsequently heated at 80° C. for 1 hour. After removing by-products of the reaction under reduced pressure, 106.1 g of a white powder are obtained.

What is claimed is:
1. A composition which crosslinks to form elastomers, comprising:
 (A) hollow polymer bodies,
 (B) addition-crosslinkable organosilicon compounds comprising an alkenyl-functional organosilicon compound and an Si—H-functional organosilicon compound, and
 (C) organic sulfur compounds.
2. A composition which crosslinks to form elastomers as claimed in claim 1, which has a viscosity of from 1000 to 2,000,000 mPa·s.
3. A composition which crosslinks to form elastomers as claimed in claim 1, wherein the hollow polymer bodies (A) have a density of from 10 to 80 kg/m$^3$ and a particle size of 5–200 μm.
4. A composition which crosslinks to form elastomers as claimed in claim 2, wherein the hollow polymer bodies (A) have a density of from 10 to 80 kg/m$^3$ and a particle size of 5–200 μm.
5. A composition which crosslinks to form elastomers as claimed in claim 1, wherein the organic sulfur compound has been applied to an inorganic filler.
6. A composition which crosslinks to form elastomers as claimed in claim 2, wherein the organic sulfur compound has been applied to an inorganic filler.
7. A composition which crosslinks to form elastomers as claimed in claim 3, wherein the organic sulfur compound has been applied to an inorganic filler.
8. A composition which crosslinks to form elastomers as claimed in claim 1, wherein the organic sulfur compound comprises one or more of 3-mercaptopropyl-trimethoxysilane, 3-mercaptopropyl-triethoxysilane, a polydimethyl-siloxane-co-mercapto-alkyl compound or octadecane-1-thiol.
9. A composition which crosslinks to form elastomers as claimed in claim 2, wherein the organic sulfur compound comprises one or more of 3-mercaptopropyl-trimethoxysilane, 3-mercaptopropyl-triethoxysilane, a polydimethyl-siloxane-co-mercapto-alkyl compound or octadecane-1-thiol.
10. A composition which crosslinks to form elastomers as claimed in claim 3, wherein the organic sulfur compound comprises one or more of 3-mercaptopropyl-trimethoxysilane, 3-mercaptopropyl-triethoxysilane, a polydimethyl-siloxane-co-mercapto-alkyl compound or octadecane-1-thiol.
11. A process for producing compositions which crosslink to form elastomers as claimed in claim 1, which comprises mixing the components A, B and C.
12. A process for producing compositions which crosslink to form elastomers as claimed in claim 2, which comprises mixing the components A, B and C.
13. A process for producing compositions which crosslink to form elastomers as claimed in claim 3, which comprises mixing the components A, B and C.
14. A process for producing compositions which crosslink to form elastomers as claimed in claim 8, which comprises mixing the components A, B and C.
15. A molding, seal or sealing composition which has been produced from a composition as claimed in claim 1.
16. A molding, seal or sealing composition which has been produced from a composition as claimed in claim 8.
17. A process for producing moldings, seals or sealing compositions, which comprises casting compositions as claimed in one or more of claim 1.
18. The process as claimed in claim 17 for producing a seal, wherein said composition is cast into a groove.
19. A process for producing moldings, seals or sealing compositions, which comprises applying a composition as claimed in claim 1 to a surface without provision of a mold.

* * * * *